US008302102B2

(12) United States Patent
Anand et al.

(10) Patent No.: US 8,302,102 B2
(45) Date of Patent: Oct. 30, 2012

(54) SYSTEM UTILIZATION THROUGH DEDICATED UNCAPPED PARTITIONS (75) Inventors: Vaijayanthimala K. Anand, Austin, TX (US); Ananda K. Venkataraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1282 days.

(21) Appl. No.: 12/038,233

(22) Filed: Feb. 27, 2008

(65) Prior Publication Data
US 2009/0217283 A1  Aug. 27, 2009

(51) Int. Cl.
*G06F 9/46* (2006.01)
(52) U.S. Cl. ....................... 718/104
(58) Field of Classification Search ............... None
See application file for complete search history.

(56) References Cited

U.S. PATENT DOCUMENTS

| | | | |
|---|---|---|---|
| 6,779,016 B1 * | 8/2004 | Aziz et al. | 709/201 |
| 6,820,217 B2 | 11/2004 | Mock et al. | |
| 6,957,435 B2 | 10/2005 | Armstrong et al. | |
| 7,096,469 B1 | 8/2006 | Kubala et al. | |
| 7,117,499 B2 | 10/2006 | Kawamoto et al. | |
| 7,140,020 B2 * | 11/2006 | McCarthy et al. | 718/104 |
| 7,222,203 B2 * | 5/2007 | Madukkarumukumana et al. | 710/260 |
| 2005/0004879 A1 | 1/2005 | Mathias et al. | |
| 2005/0192781 A1 | 9/2005 | Deltch | |
| 2007/0055830 A1 | 3/2007 | Brenner | |
| 2007/0079176 A1 | 4/2007 | Armstrong et al. | |
| 2007/0143754 A1 | 6/2007 | Imada et al. | |
| 2007/0150894 A1 | 6/2007 | Barsness et al. | |
| 2007/0169127 A1 | 7/2007 | Kashyap | |
| 2008/0077927 A1 * | 3/2008 | Armstrong et al. | 718/104 |
| 2008/0163207 A1 * | 7/2008 | Reumann et al. | 718/1 |
| 2009/0055830 A1 * | 2/2009 | Gusler et al. | 718/104 |

OTHER PUBLICATIONS

Perera, Lloyd R., "eServer i5 Uncapped Partition CPU Utilization & Queuing", IBM Corporation, Jun. 10, 2005, pp. 1-11.
Chaudhary, Piyush, "Hardware & Software Roadmap", IBM Corporation, 2007, pp. 1-28.

* cited by examiner

*Primary Examiner* — Jennifer To
*Assistant Examiner* — Eric C Wai
(74) *Attorney, Agent, or Firm* — Francis Lammes; Stephen J. Walder, Jr.; Steven L. Bennett (57) ABSTRACT

Improving system resource utilization in a data processing system is provided. A determination is made as to whether there is at least one ceded virtual processor in a plurality of virtual processors in a shared resource pool. Responsive to existence of the at least one ceded virtual processor, a determination is made as to whether there is at least one dedicated logical partition configured for a hybrid mode. Responsive to identifying at least one hybrid configured dedicated logical partition, a determination is made as to whether the at least one hybrid configured dedicated logical partition requires additional virtual processor cycles. If the at least one hybrid configured dedicated logical partition requiring additional virtual processor cycles, the at least one ceded virtual processor is deallocated from the plurality of virtual processors and allocated to a surrogate resource pool for use by the at least one hybrid configured dedicated logical partition.

20 Claims, 6 Drawing Sheets

SYSTEM UTILIZATION THROUGH DEDICATED UNCAPPED PARTITIONS

BACKGROUND OF THE INVENTION

1. Field of the Invention

The present application relates generally to an improved data processing system and method. More specifically, the present application is directed to improving system utilization through dedicated uncapped partitions.

2. Background of the Invention

Virtualization of computing resources is important in current computer environments. International Business Machine's POWER™ hypervisor, which is part of the firmware in Power 5™ systems, allows the virtualization of physical processors. Hypervisor is a virtual manager that partitions a system into multiple virtual machines and manages the system's resources across the virtual machines. These partitions can use whole physical processors or a fractional part of a whole physical processor. Each partition is assigned virtual processors that get mapped to a whole or a fractional part of physical processors by the Hypervisor. In case of fractional processor entitlement, physical processors are time-sliced across the virtual processors. In such an environment, fractional processor allocations enable a greater number of partitions than the number of available physical processors in the system. In addition, each of these partitions may have an arbitrary number of virtual processors in each partition or virtual machine. This configuration allows an opportunity for any partition to use all the available processors at any time if entitlement is defined as uncapped and the physical processors are idle in the system. Partition entitlement is the amount of time a partition is guaranteed to get processor time within a dispatch wheel time (time slice). Within the partition, virtual processors run to limits of partitioned entitlement before virtual processors are time-sliced or virtual processors running in a partition cede their cycles as a result of lack of work to do, that is, other partitions are idle. The "uncapped partition entitlement" allows the partition to use more resources than what the entitlement limit is set. The partition entitlement of a partition is evenly distributed amongst the online virtual processors so that the number of online virtual processors impacts the length of each virtual processor's dispatch cycle.

In addition to entitlement, partitions are divided into two types of partitions, namely dedicated logical partitions and shared logical partitions. Shared logical partition resources are managed as part of a shared pool and dedicated logical partition resources are dedicated to a given partition meaning the resources are not part of a pool where multiple partitions can share the resources. If the dedicated partition is configured to donate cycles, then dedicated partition processor cycles are given to shared partitions. However, the dedicated partition processor's cycles is not part of the shared pool per se. While dedicated logical partition resources are allowed to be given to shared logical partitions if the dedicated logical partition resources are idle and not used by the dedicated logical partitions, the reverse is not true. That is, if the resources in shared pool are not used by shared partitions, the resources are wasted and never allowed to be given to dedicated partitions. This is due to the fact that a dedicated logical partition is not allowed to use more resources than the dedicated logical partition is configured for. Therefore, even with virtualization there are situations where resources go unused. By introducing various types of virtual machines or partitions, the system is tailored to suit different types of situations. However there is still room for improving system utilization by allowing complete flexibility.

BRIEF SUMMARY OF THE INVENTION

In one illustrative embodiment, a method, in a data processing system, is provided for improving system resource utilization. The illustrative embodiments determine if there is at least one virtual processor in a plurality of virtual processors in a shared resource pool that is ceded. Responsive to existence of the at least one ceded virtual processor in the shared resource pool, the illustrative embodiments determine if there is at least one dedicated logical partition configured for a hybrid mode. Responsive to identifying at least one hybrid configured dedicated logical partition, the illustrative embodiments determine if the at least one hybrid configured dedicated logical partition requires additional virtual processor cycles. Responsive to the at least one hybrid configured dedicated logical partition requiring additional virtual processor cycles, the illustrative embodiments deallocate the at least one ceded virtual processor from the plurality of virtual processors in the shared resource pool. The illustrative embodiments then allocate the at least one ceded virtual processor to a surrogate resource pool for use by the at least one hybrid configured dedicated logical partition.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
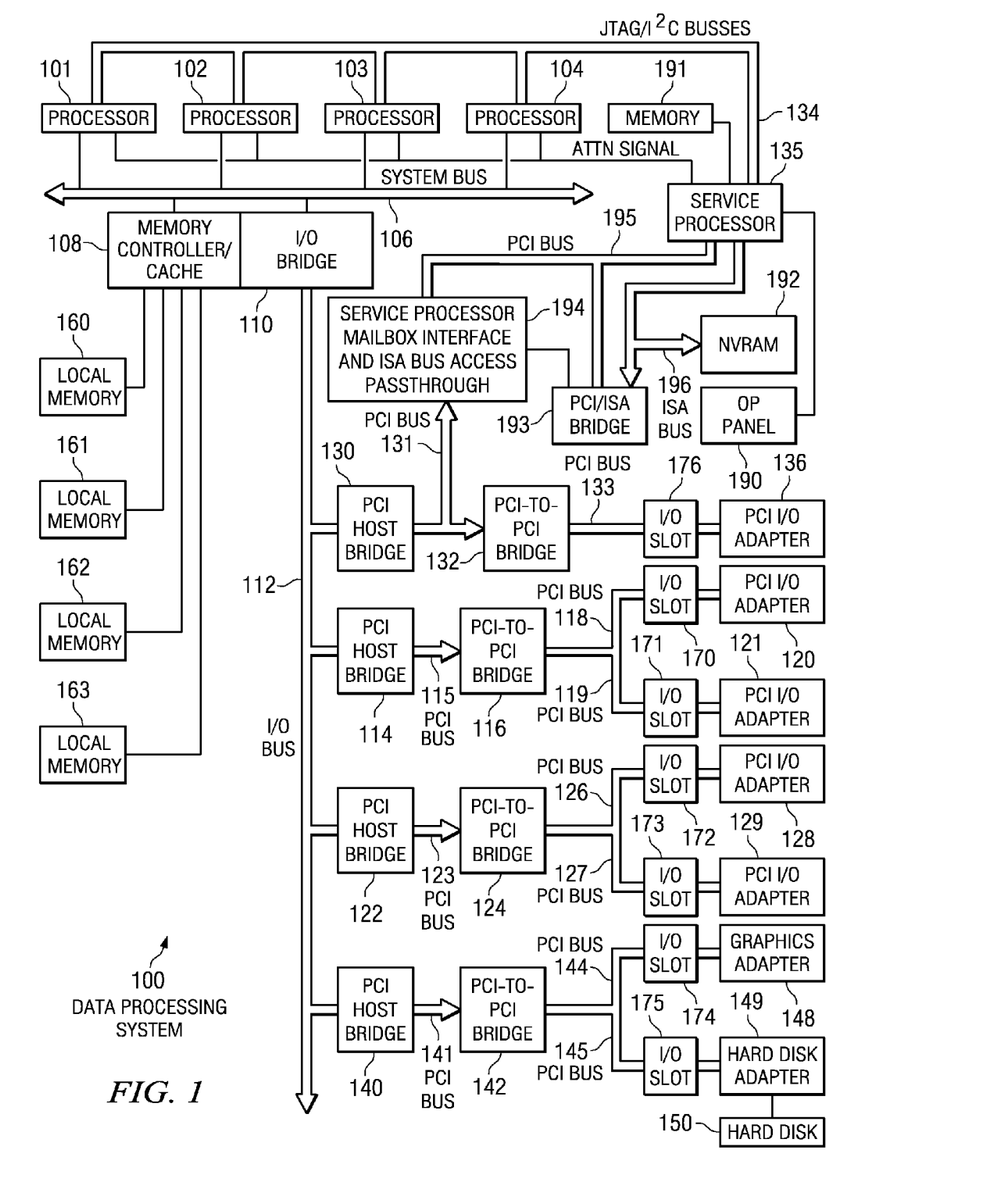
FIG. 1 depicts an exemplary block diagram of a data processing system in which the illustrative embodiments may be implemented.
Figure 2:
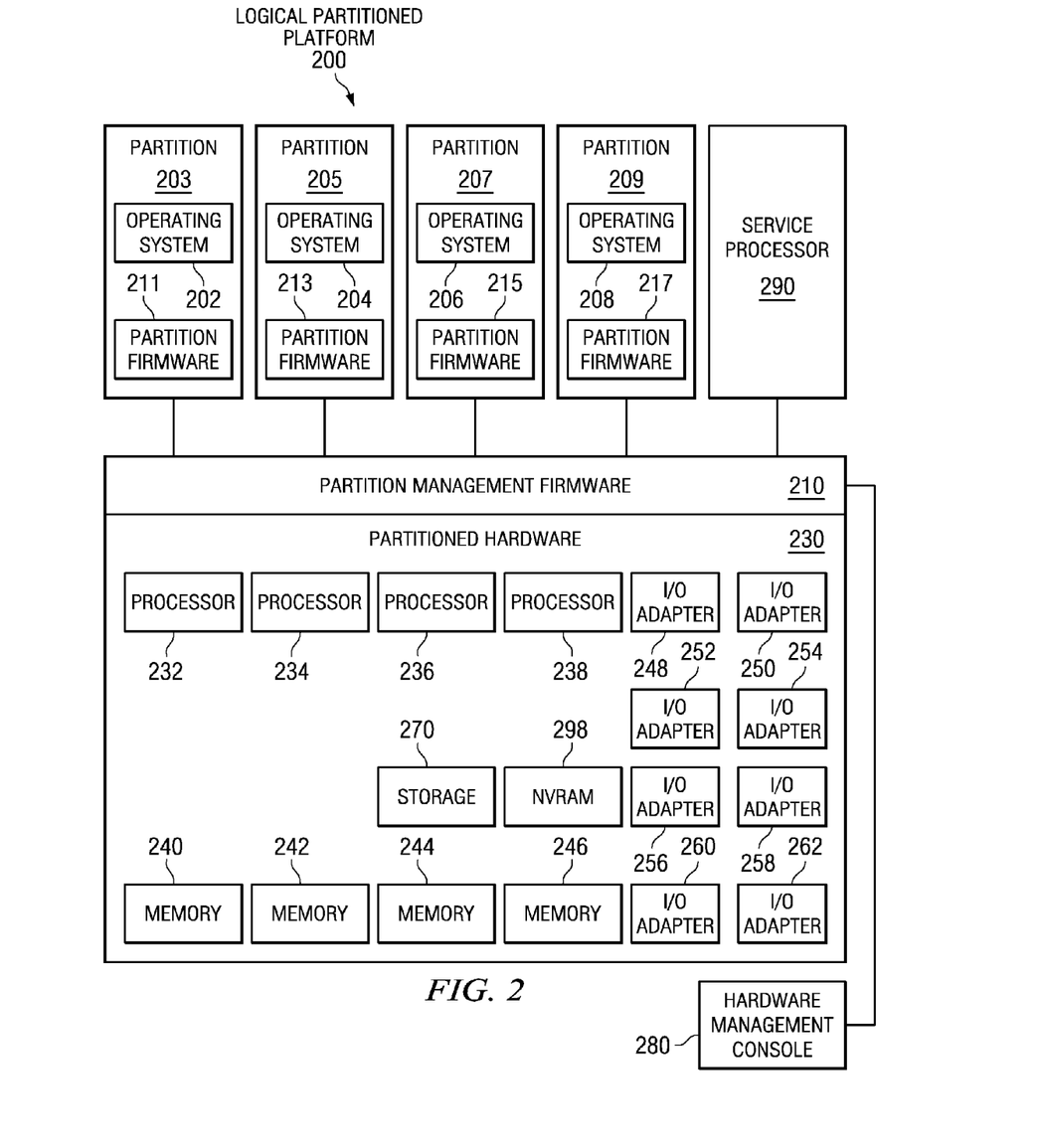
FIG. 2 depicts a block diagram of an exemplary logically partitioned platform in which the illustrative embodiments may be implemented.

The illustrative embodiments provide mechanisms for improved system utilization through dedicated uncapped partitions. As such, the mechanisms of the illustrative embodiments are especially well suited for implementation within a distributed data processing environment and within, or in association with, data processing devices, such as servers, client devices, and the like that are characterized by a high rate of relatively short I/O operations. In order to provide a context for the description of the mechanisms of the illustrative embodiments, FIGS. 1-2 are provided hereafter as examples of a distributed data processing system, or environment, and a data processing device, in which, or with which, the mechanisms of the illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts an exemplary block diagram of a data processing system in which the illustrative embodiments may be implemented. Data processing system 100 may be a symmetric multiprocessor (SMP) system, or a heterogeneous multiprocessor system, including a plurality of processors 101, 102, 103, and 104 connected to system bus 106. For example, data processing system 100 may be an IBM® eServer™, a product of International Business Machines Corporation of Armonk, N.Y., implemented as a server within a network. Moreover, data processing system 100 may be a Cell Broadband Engine (CBE) data processing system, another product of International Business Machines Corporation. Alternatively, a single processor system may be employed.

Also connected to system bus 106 is memory controller/cache 108, which provides an interface to a plurality of local memories 160-163. Input/Output (I/O) bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149, or individual functions of any of the above adapters, may be assigned to different logical partitions (LPARs). In this case, graphics adapter 148 provides a connection for a display device (not shown), while hard disk adapter 149 provides a connection to control hard disk 150.

Thus, for example, assume data processing system 100 is divided into three logical partitions, P1, P2, and P3. Each of PCI I/O adapters 120-121, 128-129, 136, graphics adapter 148, hard disk adapter 149, or individual functions of any of the above adapters, each of host processors 101-104, and memory from local memories 160-163 are assigned to the three partitions.

In these examples, local memories 160-163 may take the form of dual in-line memory modules (DIMMs). The DIMMs are not normally assigned on a per DIMM basis to the partitions but rather, a partition will be assigned a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. For example, one instance of the Advanced Interactive Executive (AIX®) operating system may be executing within partition P1, a second instance (image) of the AIX operating system may be executing within partition P2, and a Linux® or OS/400 operating system may be operating within logical partition P3.

Peripheral component interconnect (PCI) host bridge 114, connected to I/O bus 112, provides an interface to PCI bus 1 15. A number of PCI input/output adapters 120-121 may be connected to PCI bus 115 through PCI-to-PCI bridge 116, the PCI bus 118, the PCI bus 119, the I/O slot 170, and the I/O slot 171. PCI-to-PCI bridge 116 provides an interface to PCI bus 118 and PCI bus 1 19. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices.

An additional PCI host bridge 122 connected to I/O bus 112 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128 and 129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141, and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

PCI host bridge 130 provides an interface for PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus 131 also connects PCI host bridge 130 to service processor mailbox interface and ISA bus access passthrough logic 194. Service processor mailbox interface and ISA bus access passthrough logic 194 forwards PCI accesses destined to PCI/ISA bridge 193. Non-volatile RAM (NVRAM) storage 192 is connected to ISA bus 196.

Service processor 135 is coupled to service processor mailbox interface and ISA bus access passthrough logic 194 through its local PCI bus 195. Service processor 135 is also connected to processors 101-104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of host processors 101, 102, 103, and 104 are connected together to an interrupt input signal of the service processor 135. Service processor 135 has its own local memory 191 and has access to hardware OP-panel 190.

When data processing system 100 is initially powered up, service processor 135 uses JTAG/I²C busses 134 to interrogate the system (host) processors 101-104, memory controller/cache 108, and I/O bridge 110. At completion of this step, service processor 135 has an inventory and topology understanding of the data processing system 100. Service processor 135 also executes Built-In-Self-Tests (BISTs), Basic Assurance Tests (BATs), and memory tests on all elements found by interrogating host processors 101-104, memory controller/cache 108, and I/O bridge 110. Any error information for failures detected during the BISTs, BATs, and memory tests are gathered and reported by the service processor 135.

If a valid configuration of system resources is still possible after taking out the elements found to be faulty during the BISTs, BATs, and memory tests, then data processing system 100 is allowed to proceed to load executable code into the local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, the I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs).

Data processing system 100 may be implemented using various commercially available computer systems. For example, data processing system 100 may be implemented using IBM® eServer™ iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments set forth hereafter but is only meant to provide one example of a data processing system in which the exemplary aspects of the illustrative embodiments may be implemented.

With reference now to FIG. 2, a block diagram of an exemplary logically partitioned platform is depicted in which the illustrative embodiments may be implemented. The hardware in the logically partitioned platform 200 may be implemented, for example, using the hardware of the data processing system 100 in FIG. 1.

Logically partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logically partitioned platform 200. These operating systems may be implemented, for example, using OS/400, which is designed to interface with a virtualization mechanism, such as partition management firmware, e.g., a hypervisor. OS/400 is used only as an example in these illustrative embodiments. Of course, other types of operating systems, such as AIX® and Linux®, may be used depending on the particular implementation. Operating systems 202, 204, 206, and 208 are located in logical partitions 203, 205, 207, and 209, respectively.

Hypervisor software is an example of software that may be used to implement platform (in this example, partition management) firmware 210 and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM).

Logical partitions 203, 205, 207, and 209 also include partition firmware 211, 213, 215, and 217. Partition firmware 211, 213, 215, and 217 may be implemented using IPL or initial boot strap code, IEEE-1275 Standard Open Firmware, and runtime abstraction software (RTAS), which is available from International Business Machines Corporation.

When logical partitions 203, 205, 207, and 209 are instantiated, a copy of the boot strap code is loaded into logical partitions 203, 205, 207, and 209 by partition management firmware 21 0. Thereafter, control is transferred to the boot strap code with the boot strap code then loading the open firmware and RTAS. The processors associated or assigned to logical partitions 203, 205, 207, and 209 are then dispatched to the logical partition's memory to execute the logical partition firmware.

Partitioned hardware 230 includes a plurality of processors 232-238, a plurality of system memory units 240-246, a plurality of input/output (I/O) adapters 248-262, and storage unit 270. Each of processors 232-238, memory units 240-246, NVRAM storage 298, and I/O adapters 248-262 may be assigned to one of multiple logical partitions 203, 205, 207, and 209 within logically partitioned platform 200, each of which corresponds to one of operating systems 202, 204, 206, and 208.

Partition management firmware 210 performs a number of functions and services for logical partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of the logical partitioned platform 200.

Service processor 290 may be used to provide various services, such as processing of platform errors in logical partitions 203, 205, 207, and 209. Service processor 290 may also act as a service agent to report errors back to a vendor, such as International Business Machines Corporation. Operations of the different logical partitions may be controlled through hardware management console 280. Hardware management console 280 is a separate data processing system from which a system administrator may perform various functions including reallocation of resources to different logical partitions.

As discussed above, logical partitions are generally classified by as being either dedicated logical partitions or shared logical partitions. In addition, dedicated partition resources associated with the dedicated logical partitions may be used by the dedicated logical partitions as well as the shared logical partitions if the dedicated logical partitions are not using the dedicated partition resources. However, shared partition resources associated with shared logical partitions may not be used by dedicated logical partitions since dedicated logical partitions are not allowed to use more resources than are dedicated to the dedicated logical partitions.

Figure 3:
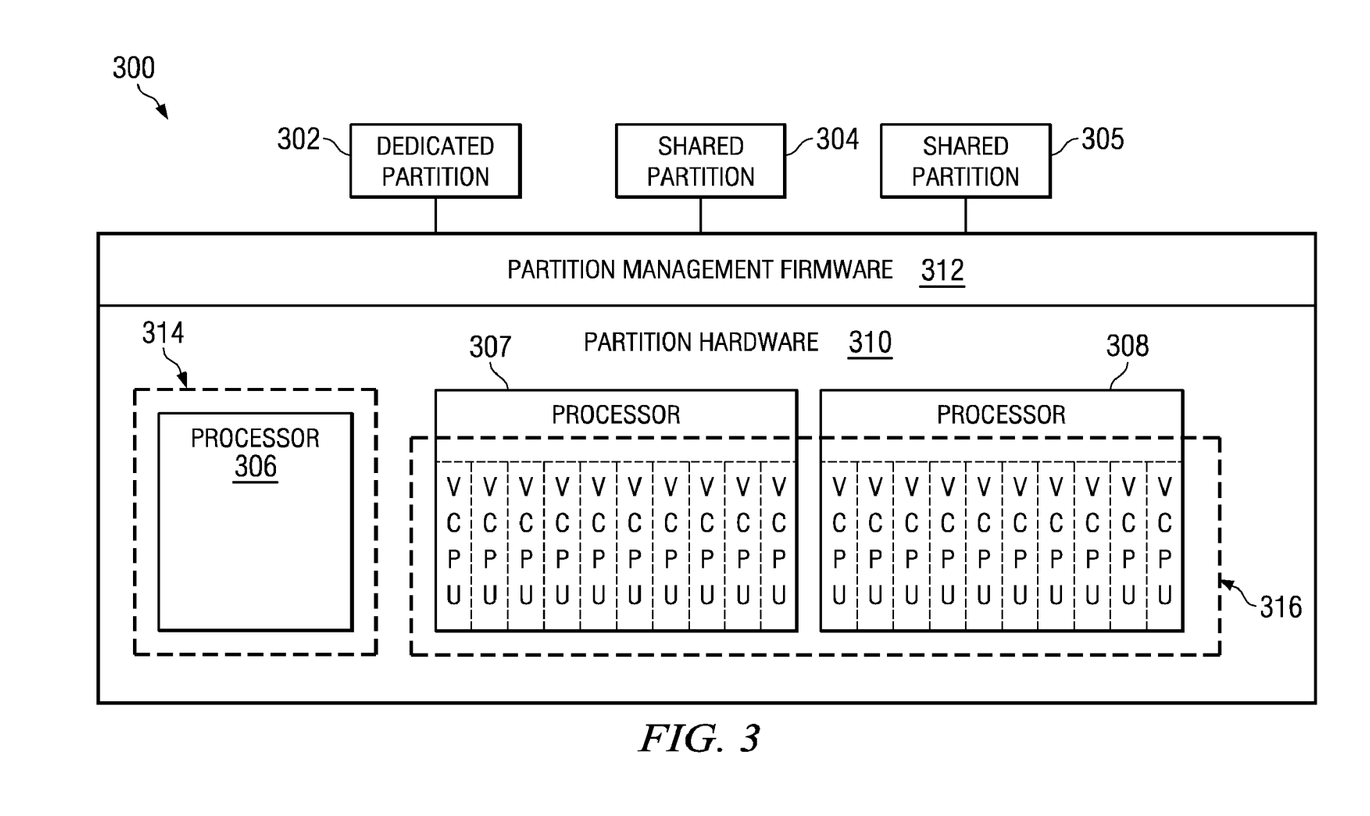
FIG. 3 depicts an exemplary illustration of resource to logical partition allocation in accordance with an illustrative embodiment.

FIG. 3 depicts an exemplary illustration of resource to logical partition allocation in accordance with an illustrative embodiment. In this example, logically partitioned platform 300 may comprise dedicated logical partition 302, shared logical partitions 304 and 305, and processors 306, 307, and 308 within partitioned hardware 310. Processor 306 may be a dedicated resource that is not partitioned and may be part of dedicated resource pool 314. Partition management firmware 312 may assign processors in whole units to dedicated logical partitions and, thus, may assign processor 306 to dedicated logical partition 302. Processors 306 and 308 may be configured by partition management firmware 312 in terms of virtual processors (VCPUs) in, for example, tenths ($1/10^{th}$) of a processor granularity. Based on the requirements of shared logical partitions 304 and 305, partition management firmware 312 may allocate VCPUs of processor 307 and 308 in tenths to shared logical partitions 304 and 305, which is referred to as partition entitlement. Partition entitlement is the amount of time a processor is guaranteed within a dispatch wheel time or time slice.

For example, partition management firmware 312 may allocate from shared resource pool 316 0.8 VCPUs to shared logical partition 304 and 1.2 VCPUs to shared logical partition 305. Each of dedicated logical partition 302 and shared logical partitions 304 and 305 are entitled to use the VCPUs that are available in dedicated resource pool 314 and shared resource pool 316, respectively.

As shared logical partitions 304 and 305 are required to share resources in shared resource pool 316, there may be instances when shared logical partitions 304 or 305 need more resources than are available in shared resource pool 316. When shared logical partitions 304 or 305 need to use more resources than is allocated in shared resource pool 316, partition management firmware 312 determines if VCPUs in dedicated resource pool 314 are ceded. A ceded VCPU in dedicated resource pool 314 is a VCPU that is not being used by dedicated logical partition 302 during a dispatch wheel. Partition management firmware 312 uses the architectural metaphor of a dispatch wheel with a predetermined rotation period of a predetermined number of milliseconds to guarantee that dedicated logical partition 302 and shared logical partitions 304 and 305 receive their allocated entitlement in a timely fashion. Partition management firmware 312 uses a simple scheduling model, where the processor entitlement is distributed with each turn of partition management firmware's 312 dispatch wheel, so dedicated logical partition 302 and shared logical partitions 304 and 305 are guaranteed a relatively constant stream of service. Entitlement has to be consumed by each partition in a single rotation of the wheel or it is ceded.

If VCPUs in dedicated resource pool 314 are ceded, partition management firmware 312 may allocate the ceded VCPUs of dedicated resource pool 314 to shared logical partitions 304 or 305. This is referred to as "uncapped partition entitlement" that allows shared logical partitions 304 or 305 to use more resources than what the entitlement limit is set. The uncapped partition entitlement is evenly distributed amongst all shared logical partitions so that the number of uncapped VCPUs impacts the length of each VCPU's dispatch cycle. However, while shared logical partitions 304 and 305 are able to use ceded VCPUs from dedicated resource pool 314, dedicated logical partition 302 is restricted to its configuration and is not able to use VCPUs that may be ceded in shared resource pool 316. That is, dedicated logical partition 302 is configured to use the VCPUs allocated in dedicated resource pool 314 and only those VCPUs. Thus, if dedicated logical partition 302 requires additional VCPUs, partition management firmware 312 may either reconfigure dedicated resource pool 314 or dedicated logical partition 302 is required to wait for VCPUs in dedicated resource pool 314 to become available.

The illustrative embodiments provide for designating formerly dedicated logical partitions as hybrid logical partitions. That is, a hybrid logical partition is given the configuration capability similar to that of a dedicated logical partition, where processing capacity is allocated in dedicated whole processor entitlement and, in addition, a hybrid partition is also allocated resources through shared entitlement. That is, without shared entitlement, the hybrid partition would have the same characteristics as a dedicated partition. The shared entitlement may be configured in terms of virtual processors (VCPUs) in, for example, tenths ($1/10^{th}$) of a processor granularity. Therefore, a hybrid logical partition may have X number of dedicated CPUs (dedicated entitlement) and Y number of shared VCPUs (shared entitlement).

Figure 4:
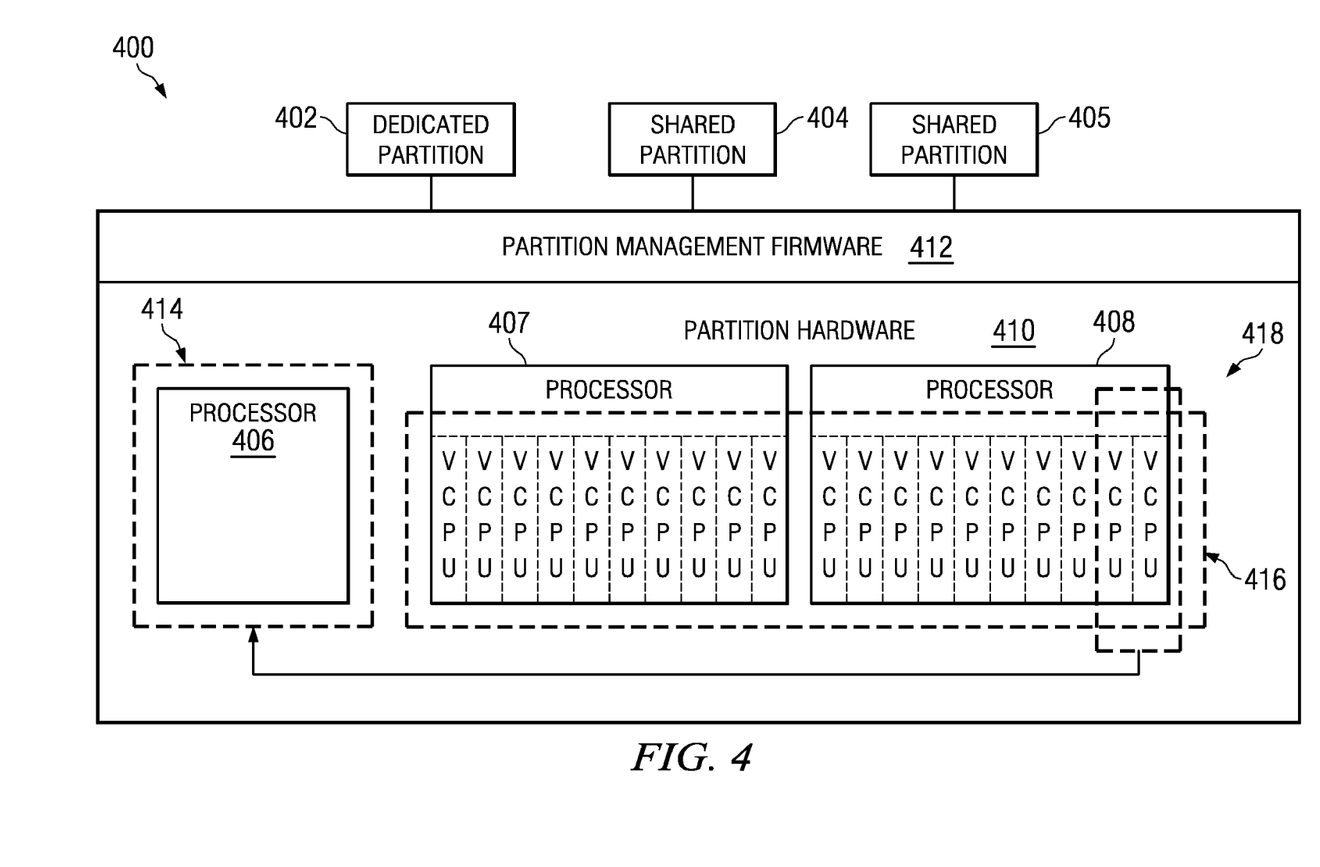
FIG. 4 depicts an exemplary illustration of using resources from a shared resource pool to a dedicated logical partition in accordance with an illustrative embodiment.

FIG. 4 depicts an exemplary illustration of using resources from a shared resource pool to a dedicated logical partition in accordance with an illustrative embodiment. In this example, logically partitioned platform 400 may comprise dedicated logical partition 402, shared logical partitions 404 and 405, and processors 406, 407 and 408 within partitioned hardware 410. Processor 406 may be a dedicated resource that is not partitioned and may be part of dedicated resource pool 414. Partition management firmware 412 may assign processors in whole units to dedicated logical partitions and, thus, may assign processor 406 to dedicated logical partition 402. Processors 407 and 408 may be configured by partition management firmware 412 in terms of virtual processors (VCPUs) in, for example, tenths ($1/10^{th}$) of a processor granularity. Based on the requirements of shared logical partitions 404 and 405, partition management firmware 412 may allocate VCPUs of processor 407 and 408 in tenths to shared logical partitions 404 and 405, which is referred to as partition entitlement. Partition entitlement is the amount of time a processor is guaranteed within a dispatch wheel time or time slice.

For example, partition management firmware 412 may allocate from shared resource pool 416 0.8 VCPUs to shared logical partition 404 and 1.2 VCPUs to shared logical partition 405. While each of dedicated logical partition 402 and shared logical partitions 404 and 405 may be entitled to used the VCPUs that are available in dedicated resource pool 414 and shared resource pool 416, respectively, and shared logical partitions 404 and 405 are able to use donated CPU cycles from dedicated resource pool 414, the illustrative embodiments provide for dedicated logical partition 402 to use ceded VCPUs from shared resource pool 416.

When VCPUs in shared resource pool 416 are unused by shared logical partitions 404 and 405 these VCPUs are considered by partition management firmware 412 to be ceded VCPUs. That is, partition management firmware 412 may not be able to assign these VCPU cycles to another shared logical partition because shared logical partitions 404 and 405 do not need those VCPUs. Partition management firmware 412 then considers the ceded VCPUs to be surrogate VCPUs and includes the surrogate VCPUs in surrogate resource pool 418. Partition management firmware 412 may dispatch VCPUs from surrogate resource pool 418 to dedicated logical partition 402 when dedicated logical partition 402 is operating in a "hybrid" mode and when dedicated logical partition 402 needs additional VCPU resources, such as, when dedicated logical partition 402 is using 100 percent of the resources in dedicated resource pool 414.

In order to determine if VCPUs are ceded in shared resource pool 416 and whether dedicated logical partition 402 is operating in a "hybrid" mode and needs additional VCPU(s), partition management firmware 412 may determine the number of VCPUs in shared resource pool 416 and the number of VCPUs in dedicated resource pool 414. Partition management firmware 412 may monitor shared resource pool 416 to determine if any of the VCPUs in shared resource pool 416 are ceded for a predetermined threshold period. If a VCPU in shared resource pool 416 has been ceded for the predetermined threshold period, partition management firmware 412 may then determine if the ceded VCPU may be used by either shared logical partition 404 or 405. If neither shared logical partition 404 or 405 needs the ceded VCPU, then partition management firmware 412 may determine if dedicated logical partition 402 is configured for "hybrid" mode and, if so, if dedicated logical partition 402 is requesting additional VCPU cycles over the entitled dedicated CPUs in dedicated resource pool 414.

If dedicated logical partition 402 is configured for "hybrid" mode and requesting additional VCPU cycles, then partition management firmware 412 may mark the ceded VCPUs from shared resource pool 416 as surrogate resource pool 418. In one illustrative embodiment, in order for the operating system of dedicated logical partition 402 to use the VCPUs in surrogate resource pool 418, the operating system uses a device tree that consists of a volatile section of resources, such as the VCPUs in surrogate resource pool 418. Operating systems, such as AIX®, Linux®, or the like, manage the resources in the volatile section of the device tree dynamically through pre-allocated structures, such as runqueues, wait threads, etc. The operating system will set the state of these dynamic resources (VCPUs) to a dormant state when the dynamic resources are removed from surrogate resource pool 418. When the dynamic resources are added to surrogate resource pool 418, the operating system will set the state of the dynamic resources to an active state.

That is, each dedicated logical partition, such as dedicated logical partition 402, may have a private copy of an open firmware device tree that reflects resources that are assigned to the dedicated logical partition and dynamic resources that may be assigned to the dedicated logical partition in the future, such as VCPUs in surrogate resource pool 418. The dynamic resources are placed in a volatile section of the open firmware device tree and this volatile section or category only includes the dynamic resources or VCPUs ceded from shared resource pool 416.

Therefore, since no processor is removed from shared logical partitions 404 or 405 and only the entitlement of VCPUs in shared resource pool 416 is reduced, the operating systems in shared logical partitions 404 or 405 do not require any changes. However, in dedicated logical partition 402 the VCPUs of surrogate resource pool 418 may be removed, thus, the interrupt sources may be re-programmed to other processors without dropping any interrupts within the operating system. When VCPUs are added to surrogate resource pool 418, partition management firmware 412 may configure the VCPUs through a global interrupt queue mechanism. These interrupts may be performed in a same manner as partition management firmware handles shared logical partition interrupts. In case of phantom interrupts, VCPUs in surrogate resource pool 418 will return to partition management firmware 412, where partition management firmware 412 may queue and service the interrupts.

If there is more than one dedicated partition in logically partitioned platform 400 and one or more of the dedicated logical partitions were configured in "hybrid" mode and requesting additional VCPU cycles above their entitlement, partition management firmware 412 may determine the allocation of the VCPUs in surrogate resource pool 418 based on a weight associated with the dedicated logical partitions. The weight is used to identify the highest priority hybrid dedicated partition that should get additional cycles from surrogate resource pool.

Partition management firmware 412 may dispatch VCPUs from surrogate resource pool 418 to dedicated logical partition 402 for a dispatch wheel time slice. Again, partition management firmware 412 may use the architectural metaphor of a dispatch wheel with a predetermined rotation period of a predetermined number of milliseconds to guarantee that dedicated logical partition 402 and any other dedicated logical partitions do not deprive shared logical partitions 404 and 405 when they need their entitled cycles. Therefore, partition management firmware 412 may use a dispatch wheel allocation so that, in case shared logical partitions 404 and 405 become busy and need the entitled VCPUs back, partition management firmware 412 may preempt the VCPUs from the dedicated partition 418.

Therefore, even as partition management firmware 412 dispatches VCPUs to dedicated logical partition 402, partition management firmware 412 may monitor shared resource pool 416 to ensure that shared logical partitions 404 and 405 are receiving their due share of VCPU entitlement. If shared logical partitions 404 and 405 are not receiving the VCPU entitlement, partition management firmware 412 may determine if there are one or more VCPUs in surrogate resource pool 418 that are ceded. If there are one or more VCPUs in surrogate resource pool 418 that are ceded, partition management firmware 412 may deallocate the one or more ceded VCPUs from surrogate resource pool 418 and may allocate the one or more VCPUs back to shared resource pool 416. If there are no ceded VCPUs in surrogate resource pool 418, partition management firmware 412 may preempt the VCPUs running in the dedicated partition and unmark the VCPUs from surrogate resource pool 418. The entitlement of shared logical partitions 404 and 405 is guaranteed, so the extra cycles that are given to dedicated logical partition 402 are retrieved when shared logical partitions 404 or 405 needs the cycles back. Then partition management firmware 412 may deallocate the one or more ceded VCPUs from surrogate resource pool 418 and may allocate the one or more VCPUs back to shared resource pool 416.

Thus, partition management firmware 412 is able to monitor the usage of VCPUs in shared resource pool 416 and reallocate ceded VCPUs from the entitlement of shared logical partitions 404 and 405 to dedicated logical partition 402 when dedicated logical partition 402 needs additional resources. In addition, as soon as shared logical partitions 404 and 405 need their entitled VCPUs back, partition management firmware 412 is able to reallocated the VCPUs back to shared resource pool 416. Thus, available partitioned resources in logically partitioned platform 400 fail to go unused.

Figure 5A:
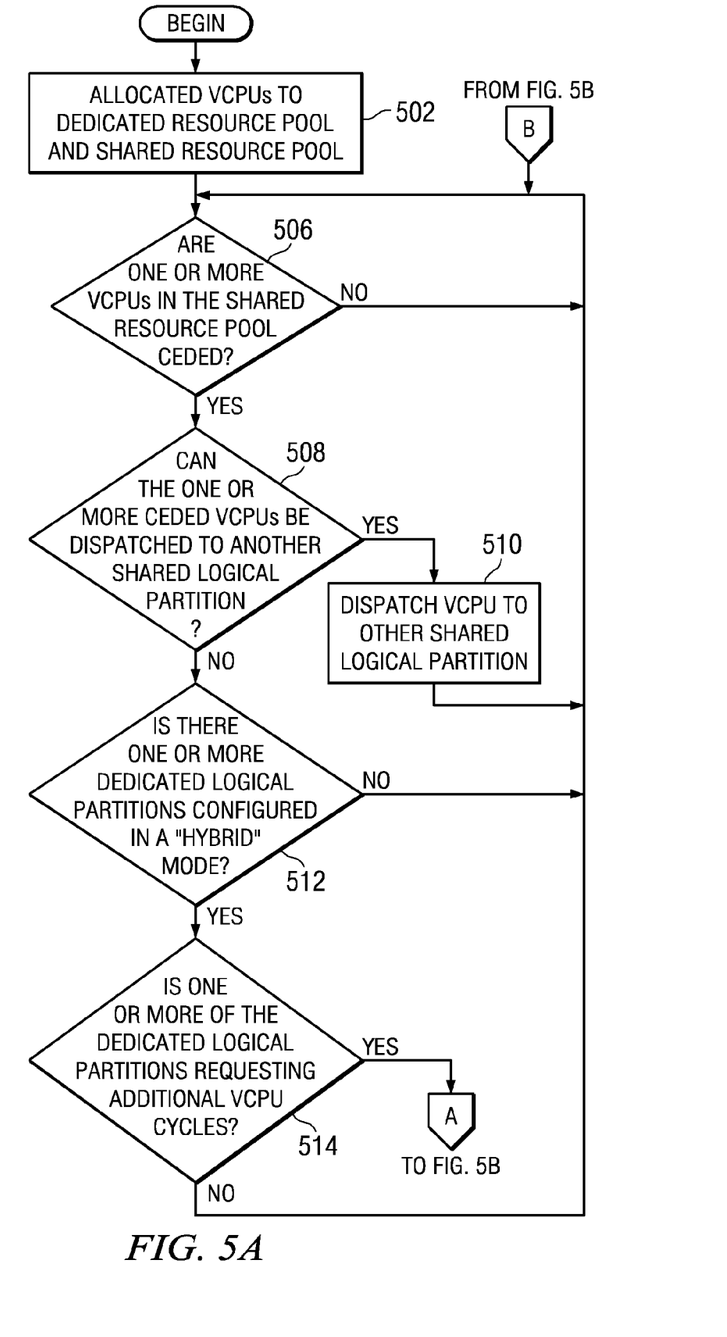
FIGS. 5A and 5B illustrate an exemplary operation of partition management firmware improving system resource utilization in accordance with an illustrative embodiment.
Figure 5B:
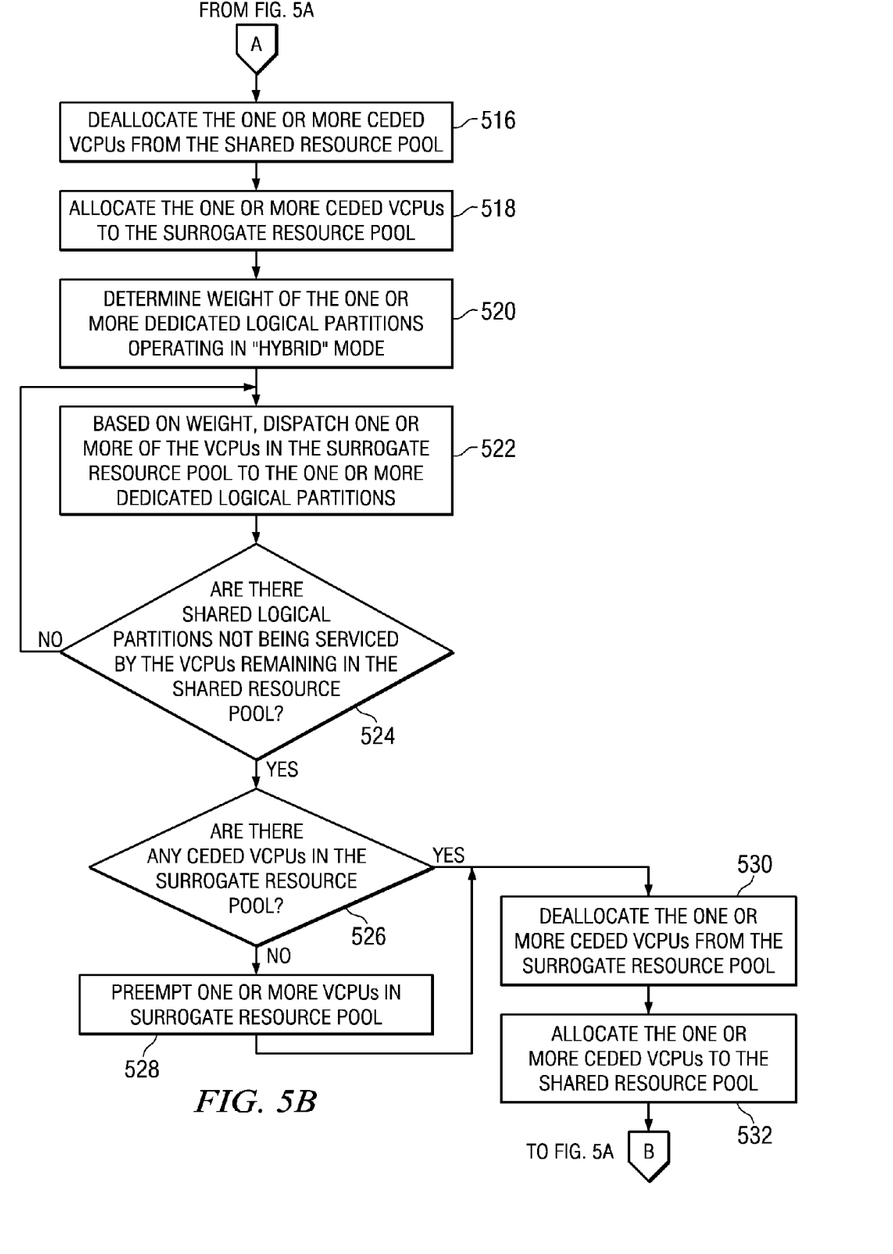

FIGS. 5A and 5B illustrate an exemplary operation of partition management firmware improving system resource utilization in accordance with an illustrative embodiment. As the operation begins, partition management firmware configures one or more processors in the logically partitioned platform based on the requirements of one or more dedicated logical partitions and one or more shared logical partitions (step 502). The partition management firmware allocates physical CPUs in whole units to the dedicated logical partitions and processors in, for example, $\frac{1}{10}^{th}$ of units, called VCPUs, to the shared logical partitions, which is referred to as partition entitlement. All of the VCPUs allocated to shared logical partitions become part of shared processor pool. Since the VCPUs are in fraction multiple VCPUs, the VCPUs share a physical processor for a fraction of time of a dispatch wheel time that is equal to its entitlement fraction that is assigned. The partition management firmware then monitors the shared resource pool to determine if any of the VCPUs in the shared resource pool are ceded (step 506). That is, the VCPU is not being used by one of the shared logical partitions for a predetermined threshold period.

If at step 506 no VCPU in the shared resource pool has been ceded for the predetermined threshold period, the operation returns to step 506. If at step 506 there are one or more VCPUs in the shared resource pool that has been ceded for the predetermined threshold period, the partition management firmware then determines if the ceded VCPU may be used by another of the shared logical partitions (step 508). If at step 508 there is another shared logical partition that needs the ceded VCPU, then the partition management firmware dispatches the VCPU to the shared logical partitions (step 510), with the operation retuning to step 506 thereafter. If at step 508 there is not another shared logical partition that needs the ceded VCPU, then the partition management firmware determines if one or more of the dedicated logical partitions are configured for "hybrid" mode (step 512).

If at step 512, there is no dedicated logical partition that is configured in "hybrid" mode, then the operation returns to step 506. If at step 512 there is a dedicated logical partition that is configured in "hybrid" mode, the partition management firmware determines if the dedicated logical partition is requesting additional processor cycles over its assigned dedicated processors (step 514). If at step 514 there are no dedicated logical partitions that need VCPUs in excess of their entitlement, then the operation returns to step 506. If at step 514 there are dedicated logical partitions that need processor cycles in excess of their dedicated processors, then the partition management firmware deallocates the ceded VCPUs from the shared resource pool (step 516).

Partition management firmware then allocates the ceded VCPUs to a surrogate resource pool (step 518). The partition management platform then determines the weight of each of the dedicated logical partitions that are configured in "hybrid" mode (step 520). Based on the weight of each of the dedicated logical partitions that are configured in "hybrid" mode, partition management firmware dispatches the VCPUs in the surrogate resource pool to dedicated logical partitions for a dispatch wheel time slice (step 522). As the partition management firmware dispatches VCPUs to then dedicated logical partitions, the partition management firmware monitors the shared resource pool to ensure that the shared logical partitions are receiving their VCPU entitlement (step 524). If at step 524 the shared logical partitions are not receiving their VCPU entitlement, then the operation returns to step 522.

If at step 524 the shared logical partitions are receiving their VCPU entitlement, the partition management firmware determines if there are one or more VCPUs in the surrogate resource pool that are ceded (step 526). If at step 526 there are no VCPUs in the surrogate resource pool that are ceded, the partition management firmware preempts the VCPU that is running in the dedicated partition (step 528). The shared partitions entitlement is guaranteed, so the extra cycles that are given to dedicated partition are pulled out when shared partition needs its cycles back. From step 528 or if at step 526 there are one or more VCPUs in the surrogate resource pool that are ceded, the partition management firmware deallocates the one or more ceded VCPUs from the surrogate resource pool (step 530). Then the partition management firmware allocates the one or more VCPUs back to the shared resource pool (step 532), with the operation retuning to step 506 thereafter.

Thus, the illustrative embodiments provide for designating formerly dedicated logical partitions as hybrid logical partitions. The hybrid logical partition is given the configuration capability similar to that of a dedicated logical partition. However, VCPUs are allocated in dedicated entitlement and through shared entitlement. The shared entitlement may be configured in terms of virtual processors (VCPUs). Therefore, a hybrid logical partition may have X number of dedicated VCPUs (dedicated entitlement) and Y number of shared VCPUs (shared entitlement).

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for improving system resource utilization, the method comprising:
   determining if there is at least one virtual processor in a plurality of virtual processors in a shared resource pool that is ceded;
   responsive to existence of the at least one ceded virtual processor in the shared resource pool, determining if there is at least one dedicated logical partition configured for a hybrid mode, wherein the at least one hybrid configured dedicated logical partition has a configuration capability similar to that of a dedicated logical partition and in addition, the at least one hybrid configured dedicated logical partition is also allocated resources through shared entitlement;
   responsive to identifying the at least one hybrid configured dedicated logical partition, determining if the at least one hybrid configured dedicated logical partition requires additional virtual processor cycles;
   responsive to the at least one hybrid configured dedicated logical partition requiting additional virtual processor cycles, deallocating the at least one ceded virtual processor from the plurality of virtual processors in the shared resource pool; and
   allocating the at least one ceded virtual processor to a surrogate resource pool for use by the at least one hybrid configured dedicated logical partition.

2. The method of claim 1, further comprising:
dispatching the at least one ceded virtual processor from the surrogate resource pool to the at least one hybrid configured dedicated logical partition for a predetermined time period.

3. The method of claim 2, further comprising:
determining a weight associated with each of the at least one hybrid configured dedicated logical partition; and
dispatching the at least one ceded virtual processor from the surrogate resource pool to the at least one hybrid configured dedicated logical partition based on the determined weight.

4. The method of claim 1, further comprising:
responsive to deallocating the at least one ceded virtual processor from the plurality of virtual processors in the shared resource pool, monitoring a remaining group of virtual processors in the shared resource pool to determine if the remaining group of virtual processors are servicing at least one shared logical partition to a point of shared resource entitlement;
responsive to a determination that the at least one shared logical partition is in need of additional virtual processor cycles to service shared resource entitlement, determining if at least one virtual processor in the surrogate resource pool is ceded;
responsive to the identifying at least one ceded virtual processor in the surrogate resource pool, deallocating the at least one ceded virtual processor from the surrogate resource pool; and
allocating the at least one ceded virtual processor to the shared resource pool for use by the at least one shared logical partition.

5. The method of claim 4, further comprising:
responsive to a failure to identify the at least one ceded virtual processor in the surrogate resource pool, preempting the at least one virtual processor in the surrogate resource pool;
deallocating the at least one ceded virtual processor from the surrogate resource pool; and
allocating the at least one ceded virtual processor to the shared resource pool for use by the at least one shared logical partition.

6. The method of claim 1, further comprising:
responsive to existence of the at least one ceded virtual processor in the shared resource pool, determining if there is at least one shared logical partition that requires the at least one ceded virtual processor; and
responsive to the at least one shared logical partition requiring the at least one ceded virtual processor, dispatching the at least one ceded virtual processor from the shared resource pool to the at least, one shared logical partition prior to determining if there is the at least one dedicated logical partition configured for the hybrid mode.

7. The method of claim 1, wherein the one or more ceded virtual processors have been ceded for a predetermined time period.

8. The method of claim 1, wherein the data processing system has at least one shared logical partition and the at least one dedicated logical partition.

9. A computer program product comprising a computer-readable storage medium having a computer readable program recorded thereon, wherein the computer readable program, when executed on a computing device, causes the computing device to:
determine if there is at least one virtual processor in a plurality of virtual processors in a shared resource pool that is ceded;
responsive to existence of the at least one ceded virtual processor in the shared resource pool, determine if there is at least one dedicated logical partition configured for a hybrid mode, wherein the at least one hybrid configured dedicated logical partition has a configuration capability similar to that of a dedicated logical partition and in addition, the at least one hybrid configured dedicated logical partition is also allocated resources through shared entitlement;
responsive to identifying the at least one hybrid configured dedicated logical partition, determine if the at least one hybrid configured dedicated logical partition requires additional virtual processor cycles;
responsive to the at least one hybrid configured dedicated logical partition requiring additional virtual processor cycles, deallocate the at: least one ceded virtual processor from the plurality of virtual processors in file shared resource pool; and
allocate the at least one ceded virtual processor to a surrogate resource pool for use by the at least one hybrid configured dedicated logical partition.

10. The computer program product of claim 9, wherein the computer readable program further causes the computing device to:
dispatch the at least one ceded virtual processor from the surrogate resource pool to the at least one hybrid configured dedicated logical partition for a predetermined time period.

11. The computer program product of claim 10, wherein the computer readable program further causes the computing device to:
determine a weight associated with each of the at least one hybrid configured dedicated logical partition; and
dispatch the at least one ceded virtual processor from the surrogate resource pool to the at least one hybrid configured dedicated logical partition based on the determined weight.

12. The computer program product of claim 9, wherein the computer readable program further causes the computing device to:
responsive to deallocating the at least one ceded virtual processor from the plurality of virtual processors in the shared resource pool, monitor a remaining group of virtual processors in the shared resource pool to determine if the remaining group of virtual processor are servicing at least one shared logical partition to a point of shared resource entitlement;
responsive to a determination that the at least one shared logical partition is in need of additional virtual processor cycles to service shared resource entitlement, determine if at least one virtual processor in the surrogate resource pool is ceded;
responsive to the identifying at least one ceded virtual processor in the surrogate resource pool, deallocate the at least one ceded virtual processor from the surrogate resource pool; and
allocate the at least one ceded virtual processor to the shared resource pool for use by the at least one shared logical partition.

13. The computer program product of claim 12, wherein the computer readable program further causes the computing device to:
responsive to a failure to identify the at least one ceded virtual processor in the surrogate resource pool, preempt the at least one virtual processor in the surrogate resource pool;

deallocate the at least one ceded virtual processor from the surrogate resource pool; and allocate the at least one ceded virtual processor to the shared resource pool for use by the at least one shared logical partition.

14. The computer program product of claim 11, wherein the computer readable program further causes the computing device to:

responsive to existence of the at least one ceded virtual processor in the shared resource pool, determine if there is at least one shared logical partition that requires the at least one ceded virtual processor; and responsive to the at least one shared logical partition requiring the at least one ceded virtual processor, dispatch the at least one ceded virtual processor from the shared resource pool to the at least one shared logical partition prior to determining if there is the at least one dedicated logical partition configured for the hybrid mode.

15. An apparatus, comprising:

a processor; and a memory coupled to the processor, wherein the memory comprises instructions which, when executed by the processor, cause the processor to:

determine if there is at least one virtual processor in a plurality of virtual processors in a shared resource pool that is ceded;

responsive to existence of the at least one ceded virtual processor in the shared resource pool, determine if there is at least one dedicated logical partition configured for a hybrid mode, wherein the at least one hybrid configured dedicated logical partition has a configuration capability similar to that of a dedicated logical partition and in addition, the at least one hybrid configured dedicated logical partition is also allocated resources through shared entitlement;

responsive to identifying the at least one hybrid configured dedicated logical partition, determine if the at least one hybrid configured dedicated logical partition requires additional virtual processor cycles;

responsive to the at least one hybrid configured dedicated logical partition requiring additional virtual processor cycles, deallocate the at least one ceded virtual processor from the plurality of virtual processors in the shared resource pool; and allocate the at least one ceded virtual processor to a surrogate resource pool for use by the at least one hybrid configured dedicated logical partition.

16. The apparatus of claim 15, wherein the instructions further cause the processor to:

dispatch the at least one ceded virtual processor from the surrogate resource pool to the at least one hybrid configured dedicated logical partition for a predetermined time period.

17. The apparatus of claim 16, wherein the instructions further cause the processor to:

determine a weight associated with each of the at least one hybrid configured dedicated logical partition; and dispatch the at least one ceded virtual processor from the surrogate resource pool to the at least one hybrid configured dedicated logical partition based on the determined weight.

18. The apparatus of claim 15, wherein the instructions further cause the processor to:

responsive to deallocating the at least one ceded virtual processor from the plurality of virtual processors in the shared resource pool, monitor a remaining group of virtual processors in the shared resource pool to determine if the remaining group of virtual processors are servicing at least one shared logical partition to a point of shared resource entitlement;

responsive to a determination that the at lea& one shared logical partition is in need of additional virtual processor cycles to service shared resource entitlement, determine if at least one virtual processor in the surrogate resource pool is ceded;

responsive to the identifying at least one ceded virtual processor in the surrogate resource pool, deallocate the at least one ceded virtual processor from the surrogate resource pool; and allocate the at least one ceded virtual processor to the shared resource pool for use by the at least one shared logical partition.

19. The apparatus of claim 18, wherein the instructions further cause the processor to:

responsive to a failure to identify the at least one ceded virtual processor in the surrogate resource pool, preempt the at least one virtual processor in the surrogate resource pool;

deallocate the at least one ceded virtual processor from the surrogate resource pool; and allocate the at least one ceded virtual processor to the shared resource pool for use by the at least one shared logical partition.

20. The apparatus of claim 15, wherein the instructions further cause the processor to:

responsive to existence of the at least one ceded virtual processor in the shared resource pool, determine if there is at least one shared logical partition that requires the at least one ceded virtual processor; and responsive to the at least one shared logical partition requiring the at least one ceded virtual processor, dispatch the at least one ceded virtual processor from the shared resource pool to the at least one shared logical partition prior to determining if there is the at least one dedicated logical partition configured for the hybrid mode.

* * * * *